Dec. 16, 1924. 1,519,569
T. VICARS
MACHINE FOR MOLDING PLASTIC SUBSTANCES
Filed Dec. 12, 1923 2 Sheets-Sheet 1

Inventor
Thomas Vicars
By Sturtevant & Mason
Attys.

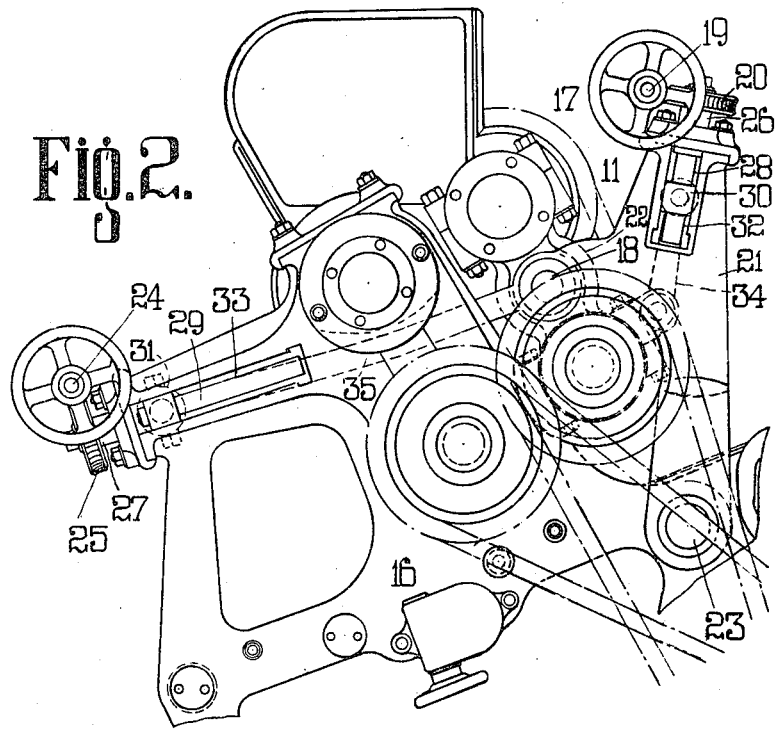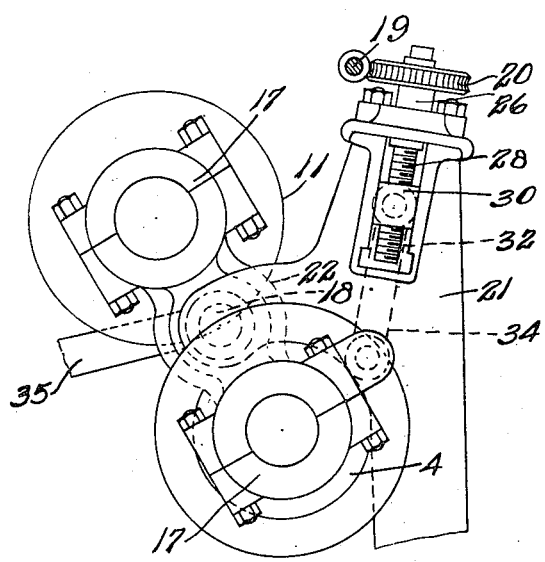

Patented Dec. 16, 1924.

1,519,569

UNITED STATES PATENT OFFICE.

THOMAS VICARS, OF EARLESTOWN, ENGLAND.

MACHINE FOR MOLDING PLASTIC SUBSTANCES.

Application filed December 12, 1923. Serial No. 680,209.

*To all whom it may concern:*

Be it known that I, THOMAS VICARS, a subject of the King of Great Britain, residing in Earlestown, in the county of Lancaster and Kingdom of England, have invented certain new and useful Improvements in Machines for Molding Plastic Substances, of which the following is a specification.

This invention relates to improvements in molding plastic substances and more particularly to a dough sheeting machine.

While the description hereinafter set forth refers to a dough sheeting machine it is not desired to limit the application of this invention to this type of machine as it may be conveniently used for molding other substances.

This invention further relates to that type of machine in which the material is fed into of a hopper and is forced by means of a pair of spaced rotating rollers into a compression chamber from which the sheet of dough is passed on to a suitable receiving device.

According to the present invention a further pair of rollers is provided at the exit from the dough compressing machine, one member of each pair being movable to vary the space between the rollers while the two movable members are mounted for simultaneous but differential adjustment.

Further by this invention one side of the dough compressing chamber is carried between the movable rollers of each pair to vary the size of the compressing chamber according to the adjustment of the said rollers.

The invention will be more particularly described with reference to the accompanying drawings, in which:—

Figure 2 shows an outside elevation of the feeding rolls and compressing chamber.

Fig. 4 is a detail of the assembly of the movable rolls and their pivot adjustment.

Figure 1:
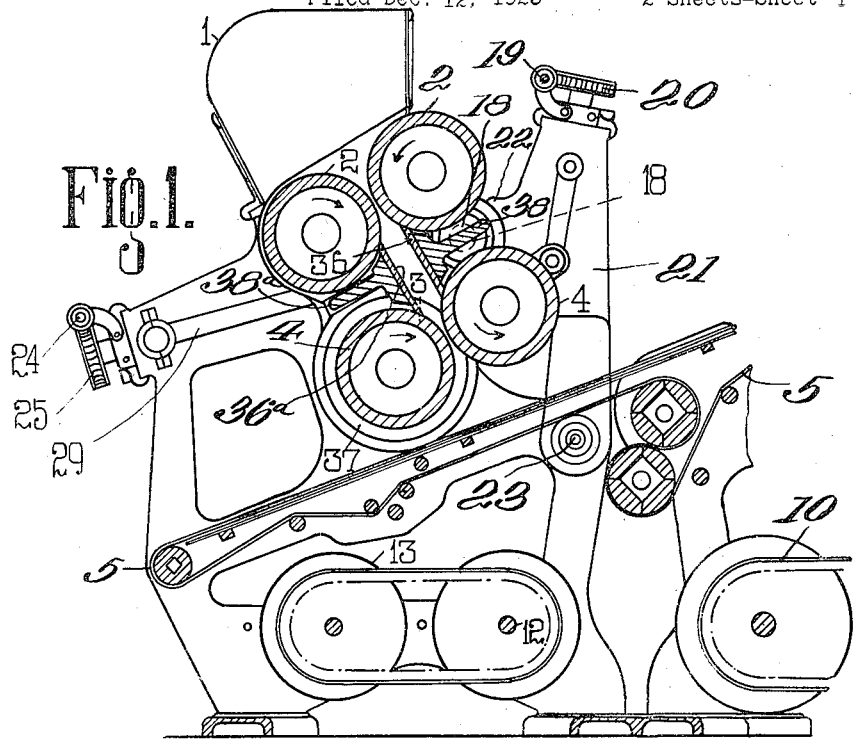
Figure 1 shows a sectional side elevation of the machine.
Figure 3:
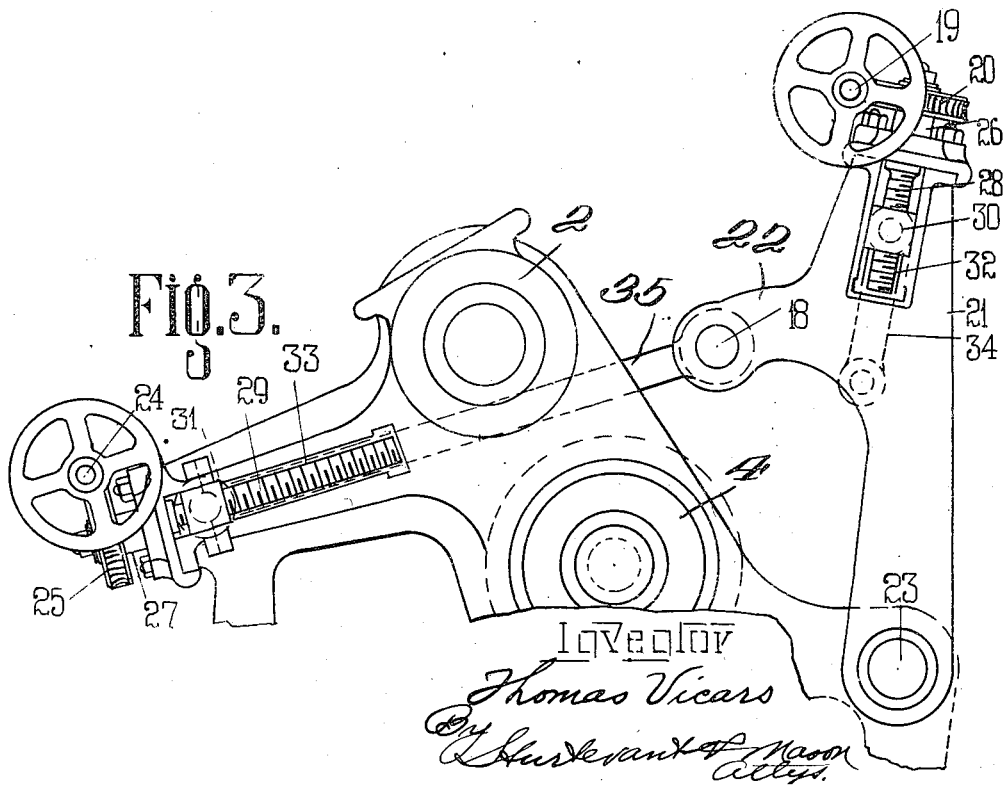
Fig. 3 is a view corresponding to Fig. 2, but on a larger scale, and with certain portions omitted.

Referring to the drawings, the machine is provided with a hopper 1 into which the material is fed and a pair of spaced rotating feeding rolls 2 on the delivery side of which is arranged a compressing chamber 3. On the side of the chamber 3 remote from the rolls 2 is arranged a second pair of rolls 4 which are also adapted to rotate and to feed the material on to a rotating endless band 5 by which the material is delivered to the action of the beating rolls or the like (not shown).

The rolls 2 are driven through a variable gear 10, the gear 10 also controlling the speed of the other rotating elements of the machine. The rolls are driven from the variable shaft of the gear 10 through compound worm gearing (not shown) and chain or the like drive 11 (Fig. 2).

From the variable shaft of the gear 10 a shaft 12 of a further variable gear 13 is driven from the variable shaft of this gear the second pair of rolls is driven through a compound worm gear (not shown) and a chain or the like drive exactly similar to the drive of the rolls 2. The endless conveyor belt 5 is also driven from the variable shaft of the gear 10 through variable transmission gears 14 and 15 respectively.

In each of the pairs of rolls 2 and 4 the left hand member is fixedly mounted on the frame 16 while the right hand member on each pair is movable to vary the distance between the rolls as required. The right hand members 2 and 4 are mounted on brackets 17 pivoted at 18, the movement about the pivot 18 being controlled by screw 19 and worm gearing 20. The brackets 17 carrying the movable members 2 and 4 are pivotally mounted in further brackets 21 having an arm 22 at the end of which is arranged the pivot 18. Brackets 21 are pivoted at 23 and controlled in their movement by means of a screw 24 and worm gear 25.

The connection between the controlling screws 19 and 24 and their respective brackets is identical and comprises internally threaded sleeves 26 and 27 and externally threaded rods 28 and 29 in threaded engagement with the sleeves 26 and 27 respectively, and prevented from rotation by means of guides 30 and 31 moving in slide ways 32 and 33 respectively, the guides being connected to the brackets by links 34 and 35.

From this construction it will be noted that the movable members of the pairs of rolls 2 and 4 can pivot about the base pivot 23 of the brackets 21 controlled by the operation of the screw 24 so that the movement of the brackets 21 about the pivot moves the roll 2 twice the distance from its co-operating roll as compared with the distance moved by the roll 4 from its co-operating roll.

In order to allow any suitable adjustment of the space between the pairs of rolls the brackets 17 pivot about the point 18 their movement being controlled by operation of the screw 19. The two rolls 2 and 4 are symmetrically mounted on the brackets 17 relatively to the pivot 18. In this manner it will be seen that any desired adjustment may be obtained between the members of the two pairs of rolls by operation of the screws 19 and 24.

The right hand side 36 of the compressing chamber 3 shown in Fig. 1 is mounted on the extension 38 of the brackets 17 so that according to the final adjustment of the brackets 17 the size of the compressing chamber 3 is varied, while the left side 36ª is supported on the extension 38ª of the frame.

The feeding rolls 2 are preferably fluted longitudinally while the delivery pair are plain, the stationary roll 4 being provided with a flange 37 at each end.

The speed of rotation of the pairs of rolls is variable so that the material is compressed or not according to requirements by varying the speed of the two pairs of rolls.

It will be seen that by the arrangement of this invention it is possible to provide a compression chamber between two pairs of rolls which will be tight to the dough and yet allow any desired adjustment of the rolls as the side wall of the compression chamber is displaceable with the movable rolls.

I declare that what I claim is:—

1. A dough molding machine comprising in combination two pairs of rolls and means to adjust the distance between one pair taken as a unit relatively to the other pair taken as a unit and means to adjust the individual distances of the rolls relatively to one another.

2. A dough molding machine including a dough compressing chamber bounded on one side by a pair of rolls on fixed axes and on the other side by a pair of rolls capable of adjustment, means being provided to displace said second pair of rolls maintaining their proportional relative distances to their fixed rolls and means to adjust the said secondary pair of rolls to vary the distances between them and their co-operating fixed rolls.

3. A dough molding machine including a dough compressing chamber bounded on one side by a pair of rolls on fixed axes and on the other side by a pair of rolls capable of adjustment, means being provided to displace said second pair of rolls maintaining their proportional relative distances to their fixed rolls, a fixed plate between said movable rolls displaceable with them and means to adjust the said secondary pair of rolls to vary the distances between them and their co-operating fixed rolls.

4. A dough molding machine comprising a hopper, four rolls beneath said hopper enclosing a dough compression chamber, two of said rolls rotating about fixed axes, a dough pressure tight wall between said rolls, a dough pressure tight wall between the opposite movable pair of rolls and displaceable with them, means to displace said movable rolls as a pair together radially away from the fixed rolls and means to rock the two movable rolls as a pair together with the dough plate between them about an external pivot.

5. A dough molding machine comprising a hopper, four rolls beneath said hopper forming a compression chamber, two of said rolls revolving about fixed axes, a yoke supporting the two movable rolls, a connecting rod attached to said yoke, means to displace said connecting rod to move the two rolls as a unit maintaining their proportional distances with the fixed rolls with which they co-operate and adjustment means to swing the yoke about the pivotal attachment of the said connecting rod for individually adjusting the distances between the individual rolls of the movable pair with their co-operating rolls with the fixed pair, whilst maintaining the dough tightness of the compression chamber.

In witness whereof, I have hereunto signed my name this 24th day of November, 1923, in the presence of two subscribing witnesses.

THOMAS VICARS.

Witnesses:
J. VICTOR ARMSTRONG,
ALFRED C. ASHTON.